(12) United States Patent
Kato et al.

(10) Patent No.: US 6,254,740 B1
(45) Date of Patent: *Jul. 3, 2001

(54) SPUTTERING METHOD OF PRODUCING AND ELECTROLUMINESCENT DEVICE WITH IMPROVED BLUE COLOR PURITY

(75) Inventors: Akira Kato, Kariya; Masayuki Katayama, Handa; Nobuei Ito, Chiryu; Tadashi Hattori, Okazaki, all of (JP)

(73) Assignee: Nippondenso Co., Ltd., Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,955

(22) Filed: Apr. 13, 1998

Related U.S. Application Data

(62) Division of application No. 08/633,998, filed on Apr. 19, 1996, now Pat. No. 5,780,966.

(30) Foreign Application Priority Data

Apr. 20, 1995 (JP) ......................................... 7-95215
Apr. 27, 1995 (JP) ......................................... 7-103846

(51) Int. Cl.[7] .................................................. C23C 14/34
(52) U.S. Cl. ............................... 204/192.25; 204/192.29; 204/192.15
(58) Field of Search ............................. 427/66; 313/503, 313/504; 428/690, 691; 204/192.26, 192.12, 192.15, 298.13

(56) References Cited

U.S. PATENT DOCUMENTS

| | | | |
|---|---|---|---|
| 4,208,613 | * 6/1980 | Hase et al. | 313/495 |
| 4,437,620 | 3/1984 | Ozawa . | |
| 5,309,070 | 5/1994 | Sun . | |
| 5,482,603 | * 1/1996 | Kawashima et al. | 204/192.26 |
| 5,554,449 | * 9/1996 | Tonomura et al. | 428/690 |
| 5,589,040 | * 12/1996 | Nishimura | 204/192.26 |
| 5,598,059 | 1/1997 | Sun . | |
| 5,747,929 | 5/1998 | Kato et al. | 313/503 |

FOREIGN PATENT DOCUMENTS 7-122363   5/1995  (JP) .

OTHER PUBLICATIONS

S–S. Sun et al., "Electroluminescene and Photoluminescence of Cerium–Activated Alkaline Earth Thiogallate Thin Films and Devices," J. Electrochem. Soc., vol. 141, No. 10 Oct. 1994, pp. 2877–2883.

(List continued on next page.)

Primary Examiner—Nam Nguyen
Assistant Examiner—Gregg Cantelmo
(74) Attorney, Agent, or Firm—Pillsbury Winthrop LLP

(57) ABSTRACT

Disclosed is a method of producing an electroluminescent (EL) device having a $CaGa_2S_4$:Ce luminescent layer. The ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum for the luminescent layer, $I^2/I_1$, is 0.1 or less. The amount of the impurity CaS in the luminescent layer is reduced. The EL device produces blue emission with high purity.

14 Claims, 8 Drawing Sheets

OTHER PUBLICATIONS

Y. Inoue et al., "Blue Electroluminescent Devices with SrGa$_2$S$_4$: Ce Thin Films Grown by Molecular Beam Epitaxy," Conference Record of the 1994 Int'l Display Research Conference and . . . Materials, Ch2.5, Oct. 1994, pp. 169–171.

Y. Inoue et al., Blue Electroluminescent SrGa$_2$S$_4$:Ce Thin Films Grown by Molecular Beam Expitaxy, Jpn. J. Appl. Phys., vol. 34, Feb.1, 1995, pp. L180–L181.

T.E. Peter and J.A. Baglio, "Luminescene and Structural Properties of Thiogallate Phosphors CE$^{+3}$ and EU$^{+2}$ –Activated Phosphors. Part I,", J. Electrochem. Soc. vol. 119, No. 9, Feb. 1972, pp. 230–236.

R.T. Tuenge, "Invited Recent Progress in Color Thin Film EL Displays," ASIA Display '95 Ch. S–12–1, Oct. 17, 1995, pp. 279–282.

W.A. Barrow et al., "A New Class of Blue TFEL Phosphors with Application to a VGA Full–Color Display," SID 93 Digest, vol. 32.1, 1993 pp. 761–764.

* cited by examiner $I_2/I_1$ FOR LUMINESCENT LAYER $I_2/I_1$ FOR SINTERED TARGET

SPUTTERING METHOD OF PRODUCING AND ELECTROLUMINESCENT DEVICE WITH IMPROVED BLUE COLOR PURITY

This is a division of application Ser. No. 08/633,998, filed Apr. 19, 1996, now U.S. Pat. No. 5,780,966 issued in Jul. 14, 1998.

CROSS REFERENCE TO RELATED APPLICATION

This application is based upon and claims the benefit of priority of the prior Japanese Patent Applications No. 7-95215 filed on Apr. 20, 1995 and No. 7-103846 filed on Apr. 27, 1995, the contents of which are incorporated herein by reference.

BACKGROUND OF THE INVENTION

1. Field of the Invention

The present invention relates to electroluminescent (hereinafter referred to as EL) devices which are used in various instruments of, for example, emissive-type segment displays and matrix displays, or in displays in various information terminal appliances. The present invention also relates to methods for producing the same.

2. Related Arts

Conventional EL devices are formed by laminating a first electrode made of an optically-transparent ITO (indium tin oxide) film, a first insulating layer comprising $Ta_2O_5$ (tantalum pentoxide) or the like, a luminescent layer, a second insulating layer, and a second electrode made of an ITO film, on an insulating glass substrate in that order.

The luminescent layer comprises, for example, a host material such as ZnS (zinc sulfide) with a luminescent center such as Mn (manganese) or Tb (terbium) added thereto, or a host material such as SrS (strontium sulfide) with a luminescent center such as Ce (cerium) added thereto.

EL devices give different colors depending on the choice of the additives in ZnS. For example, those having Mn as the luminescent center produce yellowish orange colors, while those having Tb produce green colors. EL devices having Ce as the luminescent center in SrS produce bluish green colors. To realize full-color EL displays, luminescent layers capable of producing red, green and blue colors must be formed. Of these, SrS with a luminescent center of Ce is generally used as the material for the blue-emitting layers in EL devices. However, this material naturally produces a bluish green color. Therefore, in order to attain pure blue emission, a filter capable of cutting off the green component out of the emission spectrum must be used.

As opposed to this, it is known that an EL device with a $CaGa_2S_4$:Ce luminescent layer having Ce as the luminescent center element added to the host $CaGa_2S_4$ (calcium thiogallate) can produce a blue color without using a filter, for example, as so reported in SID 93 Digest, pp. 761–764 (1993).

However, it is reported in the reference that the CIE (Commission Internationale de l'Eclairage) chromaticity coordinates for the EL device with the $CaGa_2S_4$:Ce luminescent layer indicate x=0.15 and y=0.19. On the other hand, the CIE chromaticity coordinates for ZnS:Ag that is used for the blue phosphor in cathode-ray tubes indicate X=0.15 and y=0.07 or so. The purity of the blue color produced by the conventional $CaGa_2S_4$:Ce luminescent layer is low and therefore the luminescent layer was unsatisfactory.

SUMMARY OF THE INVENTION

Considering the above-mentioned problems, the present inventors have accomplished the present invention, and an object of the present invention is to improve the blue color purity in EL devices with thiogallate luminescent layer containing calcium, such as $CaGa_2S_4$:Ce luminescent layer.

The present inventors have found from their extensive research and repetitive experiments that the X-ray diffraction spectrum for the $CaGa_2S_4$:Ce luminescent layer as produced by the conventional method shows a diffraction peak for CaS. The existence of CaS results in the green-emitting component due to CaS:Ce, which lowers the blue color purity. Therefore, the decrease, if possible, in the green-emitting component resulting from CaS:Ce will contributes to the increase in the blue color purity. On the basis of these discoveries, the present inventors have completed the present invention.

According to the present invention, a $CaGa_2S_4$:Ce luminescent layer is selected to have a film quality characterized in that the ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum for the luminescent layer, $I_2/I_1$ is 0.1 or less (including 0).

Such $CaGa_2S_4$:Ce luminescent layers can be deposited by means of a sputtering method using a sintered target which comprises as a main component $CaGa_2S_4$ doped with Ce and presents a ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum, $I_2/I_1$ that is 0.5 or less (including 0).

Other objects and features of the present invention will appear in the course of the description thereof, which follows.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
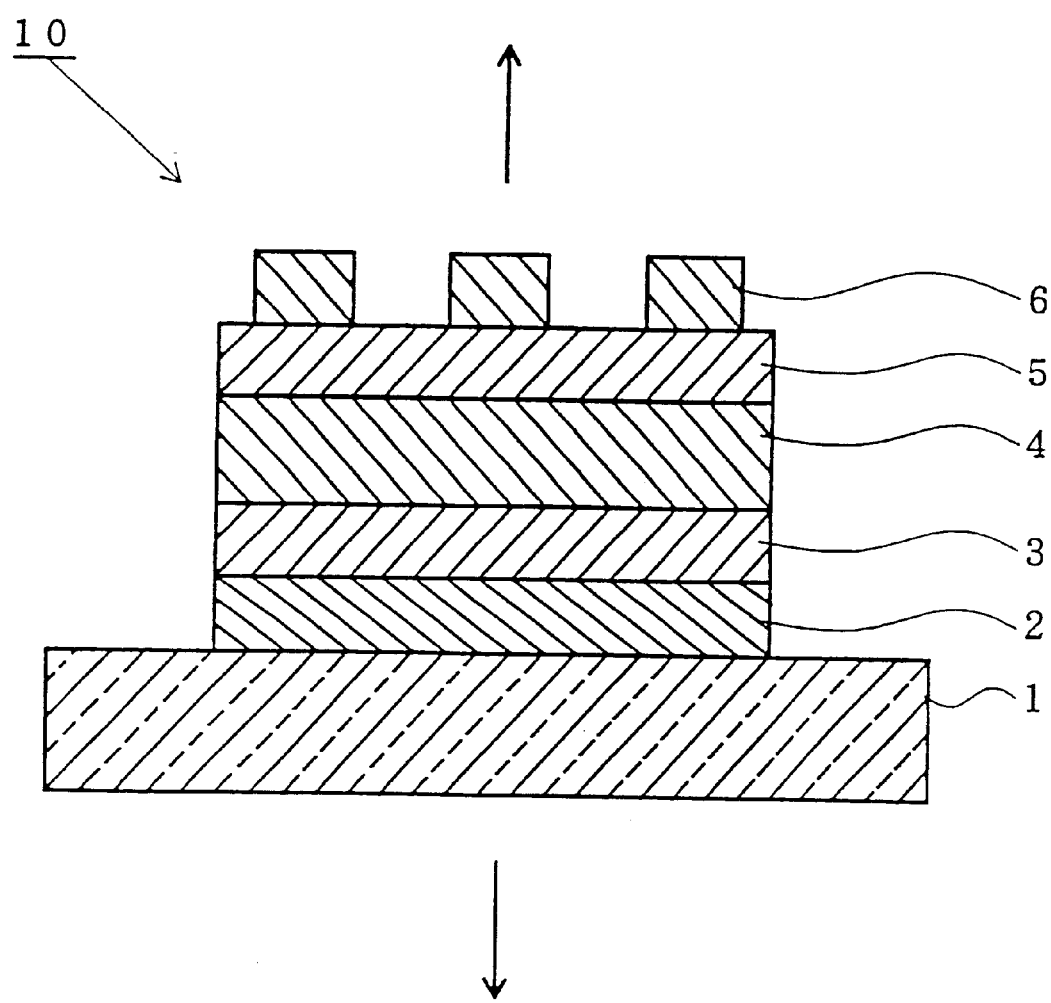
FIG. 1 is a schematic view showing the cross-section of an embodiment of the EL device of the present invention.

The EL device according to the present invention is characterized, as described above, by comprising a $CaGa_2S_4$:Ce luminescent layer which assumes in an X-ray diffraction spectrum thereof a diffraction peak for CaS controlled to improve the blue color purity.

More specifically, the first aspect of the invention resides in an EL device comprising a first electrode, a first insulating layer, a luminescent layer, a second insulating layer and a second electrode, all laminated in that order on a substrate in such a manner that the side of the device through which the light from the luminescent layer is emitted is optically transparent, the device being characterized in that the luminescent layer comprises $CaGa_2S_4$ doped with Ce as the luminescent center and that the ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum for the luminescent layer, $I_2/I_1$, is 0.1 or less (including 0).

The definition of the ratio of the CaS diffraction peak intensity to the $CaGa_2S_4$ diffraction peak intensity as appearing in the X-ray diffraction spectrum for the luminescent layer to the predetermined value or less restricts the amount of the impurity CaS existing in the luminescent layer to a predetermined value or less. As a result, the green-emitting component to be caused by CaS:Ce is decreased, thereby producing a blue color with high purity.

The second aspect of the invention resides in a method for producing the EL device, which is characterized in that a sintered target comprising $CaGa_2S_4$ doped with Ce as a luminescent center element to assume a ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum, $I_2/I_1$, of being 0.5 or less (including 0) is used for forming the luminescent layer by sputtering.

The use of the sputtering target having such a reduced content of the impurity CaS contributes to the decrease in the proportion of CaS that will grow in the luminescent layer, resulting in the formation of the luminescent layer having a reduced amount of CaS therein. Therefore, the EL device obtained by this method produces a blue color with high purity.

As the third aspect of the invention, the sintered target is produced by introducing a gallium compound into the essential component of $CaGa_2S_4$. The introduction of a gallium compound makes the amount of Ga in the luminescent layer appropriate, whereby the luminescent layer produces a blue color with higher purity. The gallium compound includes GaS, $Ga_2S_3$ and $Ga_2O_3$, one or more of which may be used.

For $Ga_2S_3$ or $Ga_2O_3$, it is desirable that its amount to be added falls between 2 mol % and 12 mol % relative to $CaGa_2S_4$. If so, the stoichiometric ratio of Ga to Ca may be about 2, resulting in the successful growth of $CaGa_2S_4$ to realize the intended pure blue emission.

As the fourth aspect of the invention, the ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum for the source material powder of $CaGa_2S_4$ that is used for the production of the sintered target, $I_2/I_1$ is 0.5 or less (including 0). The increase in the purity of the source material powder of $CaGa_2S_4$ to be used results in an increase in the purity of the sintered target, with which is formed the luminescent layer that produces a blue color with higher purity.

As the fifth aspect of the invention, the density of the sintered target to be used for the sputtering is defined to be at least 75% of the density of the single crystal of the essential material $CaGa_2S_4$. The introduction of the gallium compound into the sintered target as in the third aspect of the invention often causes variation in the density of the sintered target that depends on the amount of the gallium compound added. In this connection, the present inventors have discovered a correlation between the density of the sintered target and the Ce concentration to be in the luminescent layer which is such that the lower the density the smaller the Ce concentration. In order to evade this disadvantage, it is preferable that the density of the sintered target should be 75% or more of the density of the single crystal of $CaGa_2S_4$ to thereby prevent the variation in the Ce concentration to be in the luminescent layer and stabilize the high Ce concentration to be therein. This results in the stabilization of the emission luminance.

As the sixth aspect of the invention, the gallium compound is added to the essential material $CaGa_2S_4$ as its oxide, and the luminescent layer is formed in a sputtering gas containing a reducing gas. The addition of such a gallium oxide makes it easy to produce a sintered target having a high relative density. This is because oxides are extremely stable to water unlike sulfides that are easily hydrolyzed.

The addition of a gallium oxide is inevitably accompanied by the introduction of oxygen into the sintered target. However, the introduction of oxygen into the luminescent layer can be prevented by using a sputtering gas containing a reducing gas, and the lowering of the emission luminance is thereby prevented. As the reducing gas, employable is hydrogen sulfide. The hydrogen sulfide content of the sputtering gas may be at least 5 mol %, with which the substantial introduction of oxygen into the luminescent layer is surely prevented. More desirably, the hydrogen sulfide content is from 5 mol % to 30 mol %.

As the seventh aspect of the invention, the edges of the sintered target are chamfered or round-cornered. The sintered target with an excess amount of a gallium compound as above is more difficult to mold than that with no gallium compound and is often more brittle than the latter. The brittleness causes cracks of the edges of the sintered target, resulting in abnormal discharging during sputtering and in uneven filming of the luminescent layer. However, the processing of the edges of the sintered target as above prevents the edges of the target from being cracked and also prevents the abnormal discharging. It is desirable that the chamfering is conducted to a degree of from C 0.01 mm to C 2.0 mm or the round-cornering is from R 0.01 mm to R 2.0 mm.

The eighth aspect of the invention resides in a method for producing the EL device, which is characterized in that a source material of a II-IIIb-VIb compound is mixed with single substances or compounds of a luminescent center element and of the group IIIb element constituting the source material and sintered to give a sintered target having a density of 75% or more of the density of the single crystal of the source material, and the sintered target is sputtered to form the luminescent layer.

Using the sintered target thus having a relative density of 75% or more of the density of the single crystal of the II-IIIb-VIb compound, the variation in the concentration of the luminescent center element in the luminescent layer is prevented while the concentration is stabilized high.

As the group II element, employable are one or more selected from Ca, Sr, Ba and Zn. One or more selected from Al, Ga and In are employable as the group IIIb element. One or more selected from S and Se are employable as the group VIb element. When the group IIIb element is Ga and the group VIb element is S, the host for the luminescent layer may comprise alkaline earth thiogallates ($MGa_2S_4$ in which M=Ca, Sr, Ba).

The luminescent center element may be either a transition metal element or a rare earth element. Mn may be employed as the transition metal element, and Ce or Eu (europium) as the rare earth element.

The compounds of the group IIIb element to be added includes oxides, sulfides, selenides and their mixtures. The sulfide may be $Ga_2S_3$ or GaS (gallium(II) sulfide); and the oxide may be $Ga_2O_3$ (gallium(III) oxide).

The compounds of the group IIIb element also includes $Al_2S_3$ (aluminum sulfide), $Al_2O_3$ (aluminium(III) oxide) and their mixtures.

As one preferred embodiment of the invention, $Ga_2S_3$ or $Ga_2O_3$ is added to a II-IIIb-VIb compound, the chemical formula of which is represented as $II-IIIb_2-VIb_4$, in an amount of from 2 mol % to 12 mol %.

Using the $II-IIIb_2-VIb_4$ compound with from 2 to 12 mol % of $Ga_2S_3$ or $Ga_2O_3$, the stoichiometric ratio of the group IIIb element to the group II element in the luminescent layer formed may be about 2, resulting in the successful growth of $II-IIIb_2-VIb_4$ in the layer with which the EL device produces the intended color emission.

Hereafter, preferred embodiments of the present invention will be explained with reference to the accompanying drawings.

FIG. 1 is a schematic view showing the cross-section of a thin film EL device 10 as one embodiment of the invention, from which the emitted light is emitted in the arrowed directions.

The thin film EL device 10 comprises a first transparent electrode (first electrode) 2 made of an optically-transparent ZnO (zinc oxide), a first insulating layer 3 made of an optically-transparent $SrTiO_3$ (strontium titanate), a luminescent layer 4 made of $CaGa_2S_4$ with a luminescent center Ce, a second insulating layer 5 made of an optically-transparent $SrTiO_3$, and a second transparent electrode (second electrode) 6 made of an optically-transparent ZnO, all laminated in that order on an insulating glass substrate 1.

The thickness of the first and second transparent electrodes 2 and 6 is 300 nm each, that of the first and second insulating layers 3 and 5 is 500 nm each, and that of the luminescent layer 4 is 600 nm. The thickness of each layer is based on the site in the center of the glass substrate 1.

Next, the first embodiment of the production of the thin film EL device 10 is mentioned below.

First, a film for the first transparent electrode 2 is formed on the glass substrate 1. A pellet as formed by mixing a ZnO powder with $Ga_2O_3$ (gallium oxide) followed by shaping the resulting mixture is used for the vaporizing material. An ion-plating device is used for the formation of the film. Concretely, the ion-plating device is evacuated while the glass substrate 1 therein is kept at a pre-determined temperature. After this, argon (Ar) gas is introduced into the device to keep the pressure therein at a pre-determined value, and the beam power and the RF power are adjusted to make the filming rate fall between 6 and 18 nm/min., for example.

Next, the first insulating layer 3 of $SrTiO_3$ is formed on the first transparent electrode 2 by sputtering. Concretely, a mixed gas comprising Ar and $O_2$ (oxygen) is introduced into the sputtering device while the glass substrate 1 is kept at a pre-determined temperature, and a film of the layer 3 is formed at an RF power of 1 kW.

The $CaGa_2S_4$:Ce (calcium thiogallate doped with cerium) luminescent layer 4 comprising a host of $CaGa_2S_4$ with a luminescent center of Ce is formed on the first insulating layer 3, by sputtering.

Concretely, a mixed gas comprising Ar and 20 mol %, relative to Ar, of $H_2S$ (hydrogen sulfide) is introduced into the sputtering chamber while the glass substrate 1 therein is kept at a constant temperature of 300° C., and the luminescent layer 4 is deposited at an RF power of 300 W. As the sputtering target, used is a sintered target $CaGa_2S_4$:Ce with Ce as the luminescent center. It is desirable that the $H_2S$ concentration in the sputtering gas is from 5 mol % to 30 mol %.

Next, the thus-sputtered $CaGa_2S_4$:Ce luminescent layer 4 is heat-treated in an Ar atmosphere containing 20 mol % of $H_2S$, at 630° C. for 30 minutes. As a result, the $CaGa_2S_4$:Ce luminescent layer 4, which is in amorphous state and therefore is not luminescent just after the formation, becomes crystallized and luminescent. Next, the second insulating layer 5 of $SrTiO_3$ is formed on the luminescent layer 4 in the same manner as in the formation of the first insulating layer 3. Then, the second transparent electrode 6 of a ZnO film is formed on the second insulating layer 5 in the same manner as in the formation of the first transparent electrode 2.

The X-ray diffraction spectrum for the thin film EL device 10 thus produced in the manner mentioned above was investigated. The diffraction peak intensity in the X-ray diffraction spectrum for the (400) reflection of $CaGa_2S_4$ is herein referred to as $I_1$, and that for the (200) reflection of CaS as $I_2$.

Figure 2:
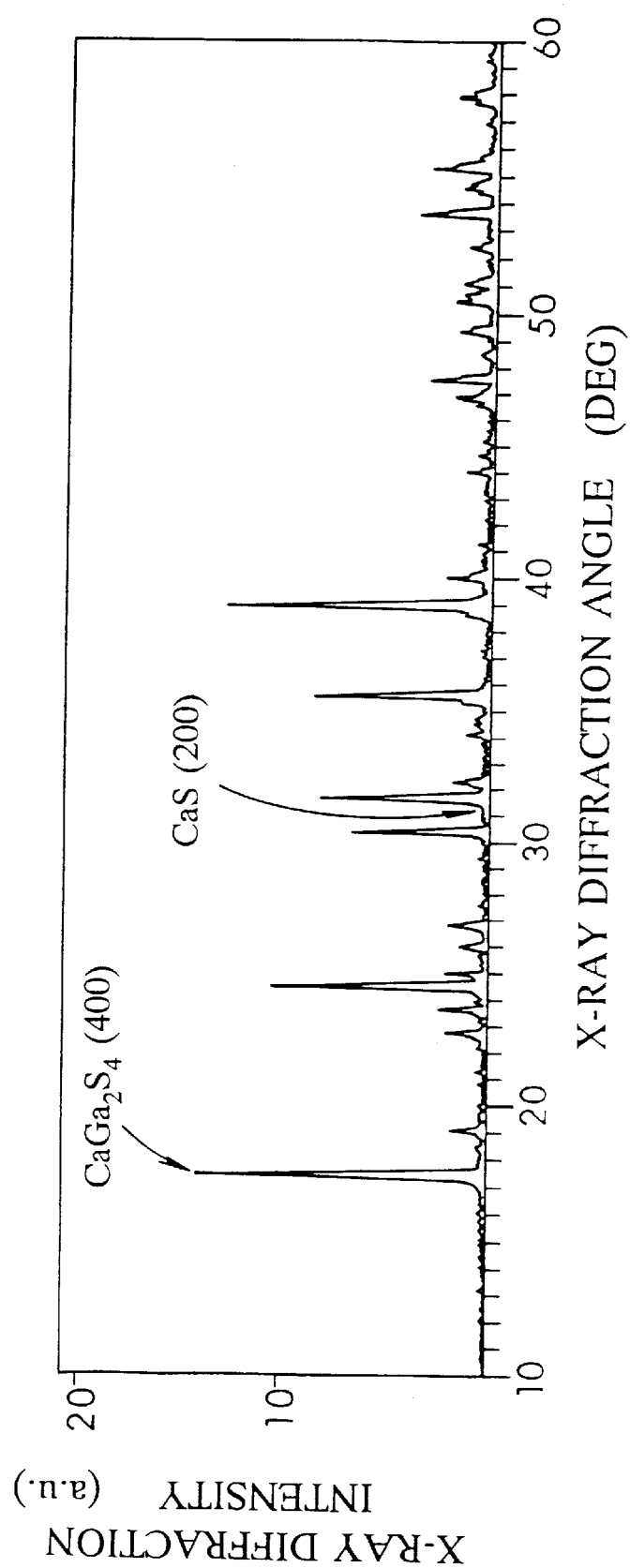
FIG. 2 is a graph showing the X-ray diffraction spectrum for a source material powder $CaGa_2S_4$ which is used for the production of a sintered target.

To produce the sintered target, used was a source material powder of $CaGa_2S_4$ with high purity to have a ratio of $I_2/I_1$ of nearly 0, as shown by the X-ray diffraction spectrum of FIG. 2. Two wt. % of $CeF_3$ (cerium fluoride) was added thereto to form the luminescent center, and the powder was sintered in $H_2S$ and formed into a sintered target by a known method.

The X-ray diffraction spectrum for the thus-formed sintered target exhibited the same characteristics as those in the X-ray diffraction spectrum shown by FIG. 2, in which, therefore, $I_2/I_1$ was nearly 0.

Figure 3:
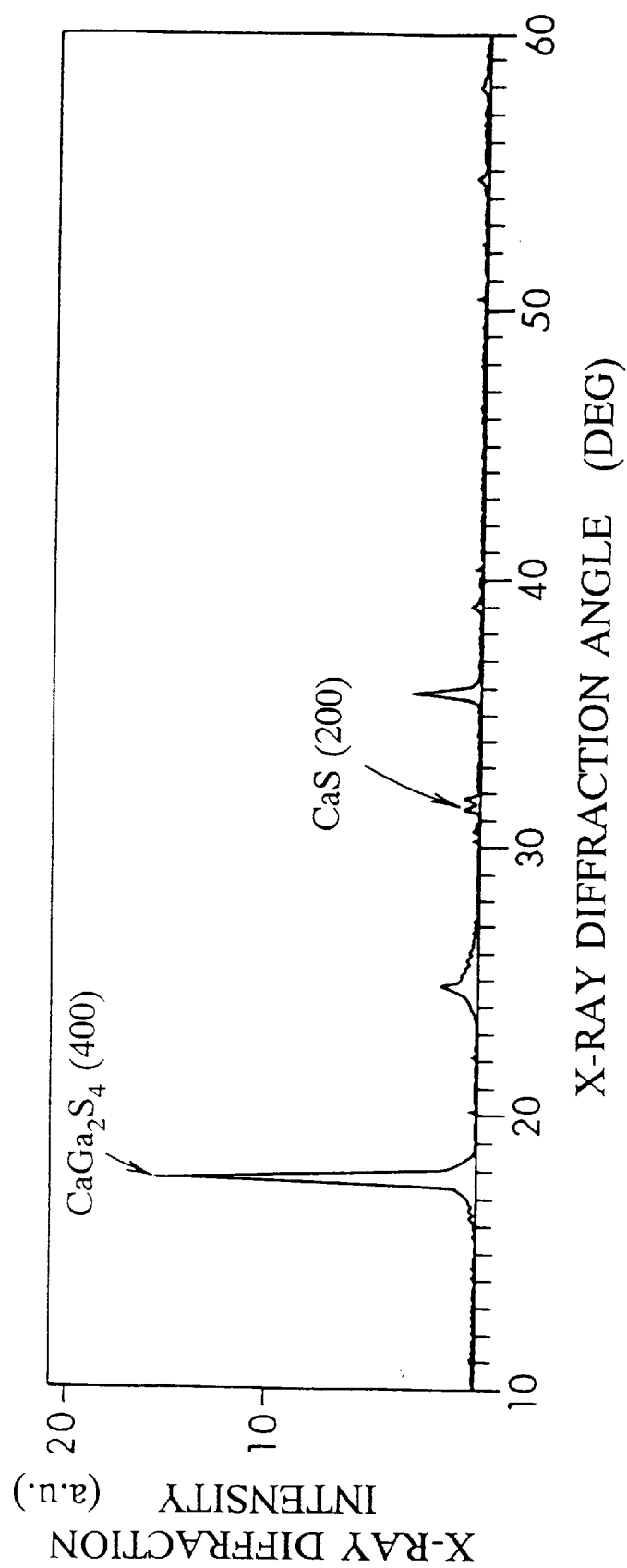
FIG. 3 is a graph showing the X-ray diffraction spectrum for the luminescent layer formed with the sintered target formed from the source material powder that gave the spectrum of FIG. 2.

FIG. 3 shows the X-ray diffraction spectrum for the luminescent layer 4 as formed from the sintered target by sputtering followed by heat treatment. The ratio of $I_2/I_1$ in the luminescent layer was about 0.05. The CIE chromaticity coordinates for the EL device 10 thus produced are such that x=0.15 and y=0.17, and the purity of the blue color from the EL device 10 was higher than that from the conventional EL device.

By lowering the ratio $I_2/I_1$ in the luminescent layer in that manner, the green-emitting component to be caused by CaS:Ce is decreased and blue-EL emission with high purity is attained.

In another embodiment (the second embodiment detailed hereinunder), 5 wt. % of $Ga_2S_3$ (gallium (III) sulfide) was added to the source material powder used hereinabove to produce the sintered target. The ratio $I_2/I_1$ in the sintered target thus produced was nearly 0.

The ratio $I_2/I_1$ in the luminescent layer 4 as formed by sputtering the sintered target and followed by heat treatment was less than 0.01. The CIE chromaticity coordinates for the EL device with the layer 4 were such that x=0.15 and y=0.16. Thus, the addition of $Ga_2S_3$ makes the amount of Ga in the luminescent layer more appropriate, by which the purity of the blue color from the luminescent layer was much more increased than the above.

Apart from $Ga_2S_3$ used in the above, the excess gallium compound to be added to the essential component $CaGa_2S_4$ may be GaS (gallium(II) sulfide) or $Ga_2O_3$ (gallium(III) oxide) or even a mixture of these. It is desirable that the amount of the gallium compound to be added is from 1 wt. % to 10 wt. %.

Next, the relationship between the ratio $I_2/I_1$ in the luminescent layer and the purity of blue color emission is referred to below.

CaS was further intentionally added to the source material powder $CaGa_2S_4$ with $I_2/I_1$ of nearly 0, such as that used in the first embodiment, and formed into sintered targets. Using these, luminescent layers with varying $I_2/I_1$ ratios were formed by sputtering and their color emission was investigated.

Figure 4:
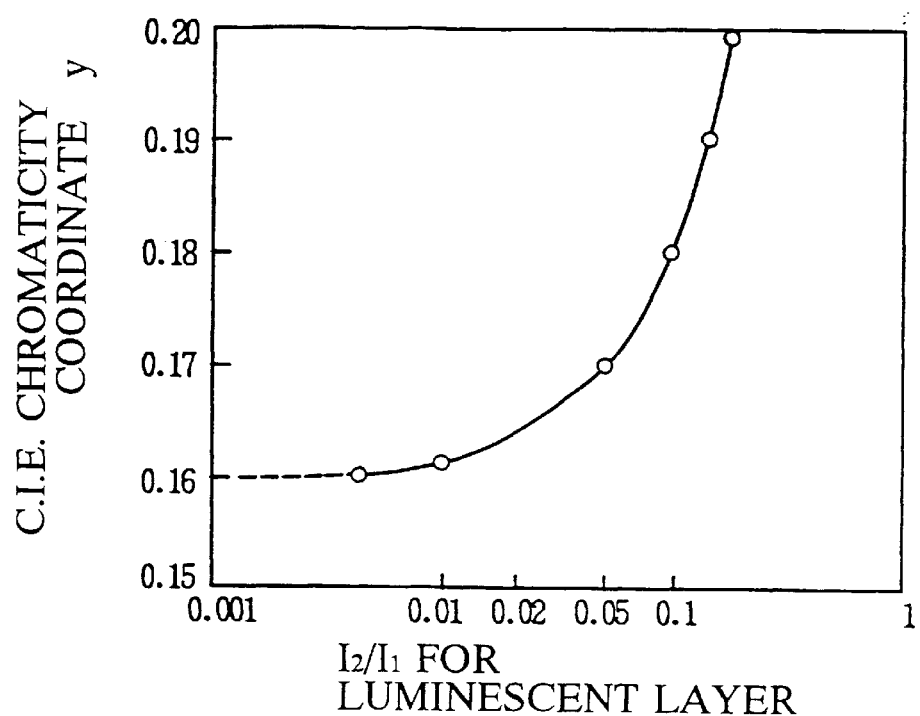
FIG. 4 is a graph showing the variation in the value y for the CIE chromaticity coordinates relative to the variation in the ratio $I_2/I_1$ for the formed luminescent layers.

FIG. 4 shows the variation in the value y for the CIE chromaticity coordinates relative to the variation in the ratio $I_2/I_1$ for the luminescent layers formed. It has been confirmed that the value x for the coordinates did not change and was constantly 0.15 irrespective of the variation in the ratio $I_2/I_1$. As is known from FIG. 4, y=0.19 in the conventional product became y=0.16 or so with the decrease in the ratio $I_2/I_1$ in the luminescent layers. Therefore, the purity of blue emission from the luminescent layers with $I_2/I_1$ of 0.1 or less shall be higher than that from the conventional luminescent layers. As shown in FIG. 4, for a luminescent layer made from a sputtering target having an $I_2/I_1$ ratio of 0.1 or less, the luminescent layer has a y value on CIE chromaticity coordinates of 0.18 or less.

Next, the ratio $I_2/I_1$ in the sintered target as well as the source material powder $CaGa_2S_4$ which is used for the production of the sintered target are investigated hereinunder.

Like the above, $CeF_3$ was added to the source material powder $CaGa_2S_4$ with $I_2/I_1$ of nearly 0 and, in addition, CaS was intentionally added thereto, thereby varying the ratio $I_2/I_1$ in the resulting source material powders. The ratio $I_2/I_1$ in the source material powders was almost the same as that in the sintered targets therefrom. Using the sintered targets thus having varying $I_2/I_1$ ratios, EL devices were produced and their EL emission was investigated. In this investigation, used was a source material powder $CaGa_2S_4$ not containing $Ga_2S_3$.

Figure 5:
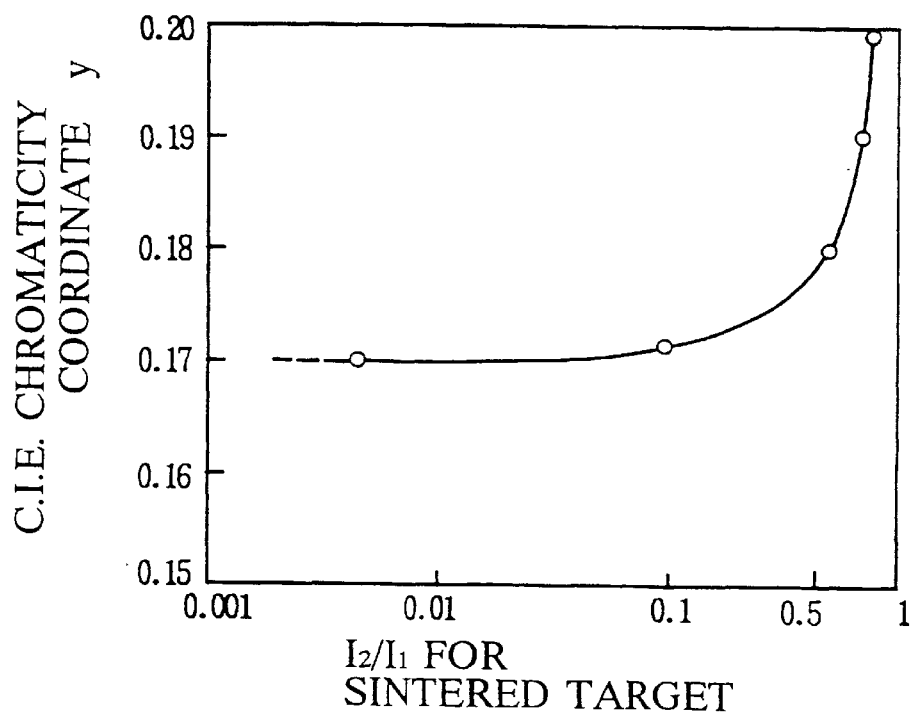
FIG. 5 is a graph showing the variation in the value y for the CIE chromaticity coordinates relative to the variation in the ratio $I_2/I_1$ for the used sintered targets.

FIG. 5 shows the variation in the value y for the CIE chromaticity coordinates relative to the variation in the ratio $I_2/I_1$ for the sintered targets formed. As is known from FIG. 5, y=0.19 in the conventional product became y=0.17 or so with the decrease in the ratio $I_2/I_1$ in the sintered targets. Therefore, the purity of blue emission from the luminescent layers made from the sintered targets with $I_2/I_1$ of 0.5 or less shall be higher than that from the conventional luminescent layers. The addition of $Ga_2S_3$ to the source material powder $CaGa_2S_4$ resulted in the higher improvement in the purity of blue emission than that in the results shown in FIG. 5.

The above-mentioned embodiment demonstrated the production of $CaGa_2S_4$:Ce EL devices. Also for other $SrGa_2S_4$:Ce EL devices and $BaGa_2S_4$:Ce EL devices, the purity of blue emission was improved by restricting the content of SrS and BaS to a pre-determined value or lower.

Next, a second embodiment of the invention is mentioned below, in which, as an additive Ga compound, $Ga_2S_3$ is mixed with a source material powder of $CaGa_2S_4$ and formed into a sintered target and the target is used to form the luminescent layer 4.

Like in the above-mentioned first embodiment, the first transparent electrode 2 of ZnO and the first insulating layer 3 of $SrTiO_3$ are formed in that order on the glass substrate 1 (FIG. 1 is referred to).

Next, the $CaGa_2S_4$:Ce luminescent layer 4 is formed on the first insulating layer 3 by sputtering. Concretely, a mixed gas comprising Ar and 20 mol %, relative to Ar, of $H_2S$ (hydrogen sulfide) is introduced into the deposition chamber while the glass substrate 1 therein is kept at a constant temperature of 300° C., and the film deposition is conducted at an RF power of 300 W.

The sputtering target used herein is prepared by adding 4 mol % of $CeF_3$ and 6 mol % of $Ga_2S_3$ to a source material $CaGa_2S_4$ followed by sintering the resulting mixture. The sintered target is formed to have a relative density of 80%. The relative density as referred to herein is obtained relative to the density of the single crystal of the essential material, i.e., $CaGa_2S_4$. As the density of the single crystal of $CaGa_2S_4$, employed is a value of 3.38 g/cm³ as reported by T. E. Peters et al., in Journal of Electrochemical Society, Vol. 119, No. 2, pp. 230–236.

Figure 6:
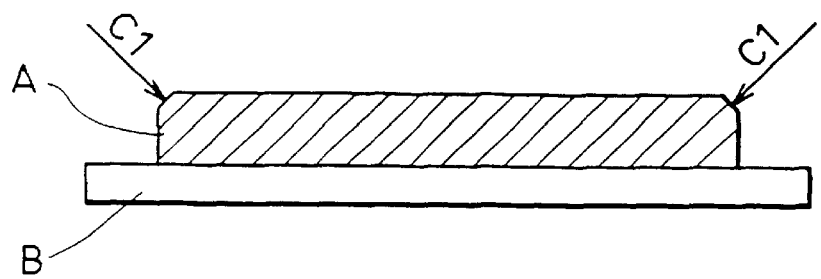
FIG. 6 is a schematic view showing the cross-section of the sintered target used for forming the luminescent layer.

The edges of the sintered target is chamfered at C 1.0 mm, as in FIG. 6 which shows the cross-section of the target. The chamfering is effective in preventing the edges from being cracked. It is desirable that the chamfering is conducted at from C 0.01 mm to C 2.0 mm. In FIG. 6, A is the sintered target and B is a backing plate.

The chamfering may be substituted with round-cornering to attain the same effect. The round-cornering is desirably conducted at from R 0.01 mm to R 2.0 mm.

Next, the deposited layer 4 is heat-treated in an Ar atmosphere containing 20 mol % of $H_2S$, at 650° C. for 5 minutes. As a result, the $CaGa_2S_4$:Ce luminescent layer 4, which is in amorphous state and therefore is not luminescent just after the deposition, becomes crystallized and luminescent.

After this, the second insulating layer 5 of $SrTiO_3$ and the second transparent electrode 6 of ZnO are formed in that order on the luminescent layer 4, in the same manner as in the first embodiment.

The Ce concentration in the luminescent layer 4 thus formed in the manner as above was measured with an EPMA (electron probe microanalyzer) to be 0.39±0.02 atm %.

The ratio of the X-ray diffraction peak intensity $I_2$ for the (200) reflection of CaS to the X-ray diffraction peak intensity $I_1$ for the (400) reflection of $CaGa_2S_4$ as appearing in the X-ray diffraction spectrum for the luminescent layer 4 as formed by sputtering in the second embodiment, $I_2/I_1$, was 0.05.

Figure 7:
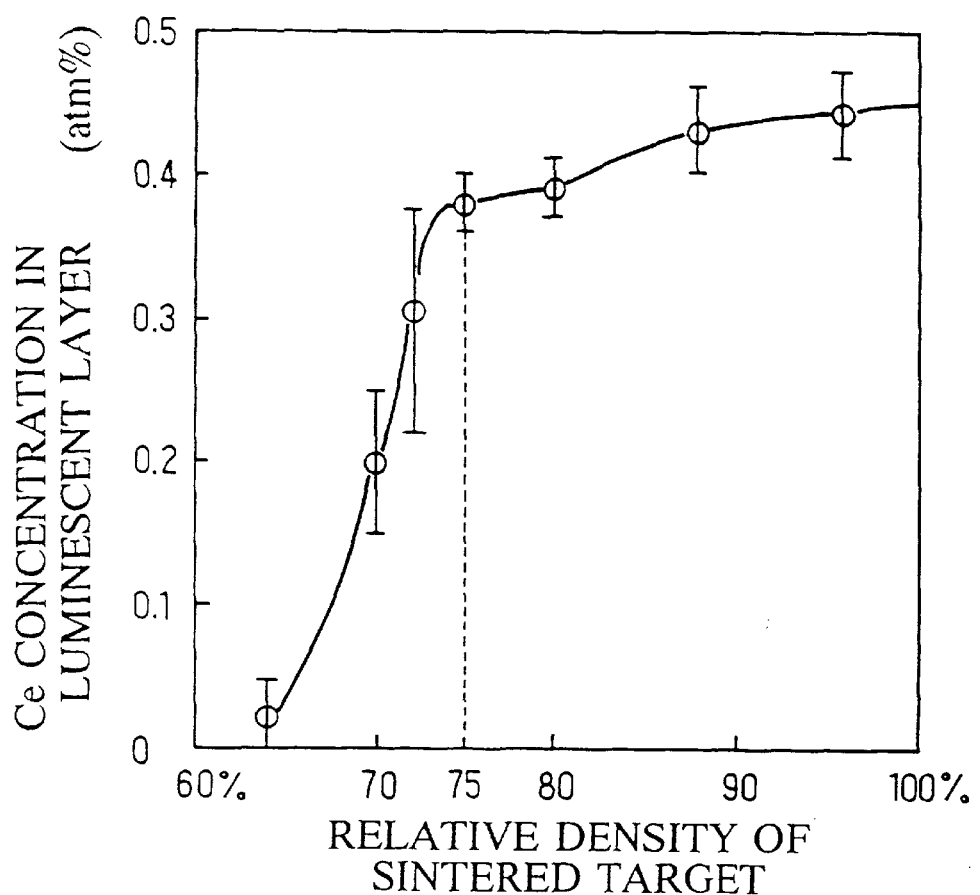
FIG. 7 is a graph showing the relationship between the Ce concentration in the formed luminescent layer and the relative density of the used sintered target.

Next, various sintered targets were prepared, and the relationship between the relative density of the target and the Ce concentration in the resultant luminescent layer was investigated. Sintered targets with varying relative densities were prepared by hot-pressing. The results from the investigation are shown in FIG. 7. From FIG. 7, it is known that the sintered targets with relative density of 75% or more presented almost no difference in the Ce concentration in the luminescent layers to be formed therefrom but those with relative density of less than 75% led to the noticeable decrease in the Ce concentration. Therefore, in order to introduce Ce into the luminescent layers with high reproducibility, it is effective to make the sintered targets have a relative density of 75% or more. Furthermore, the sintered targets with relative density of 75% or more were less brittle.

Figure 8:
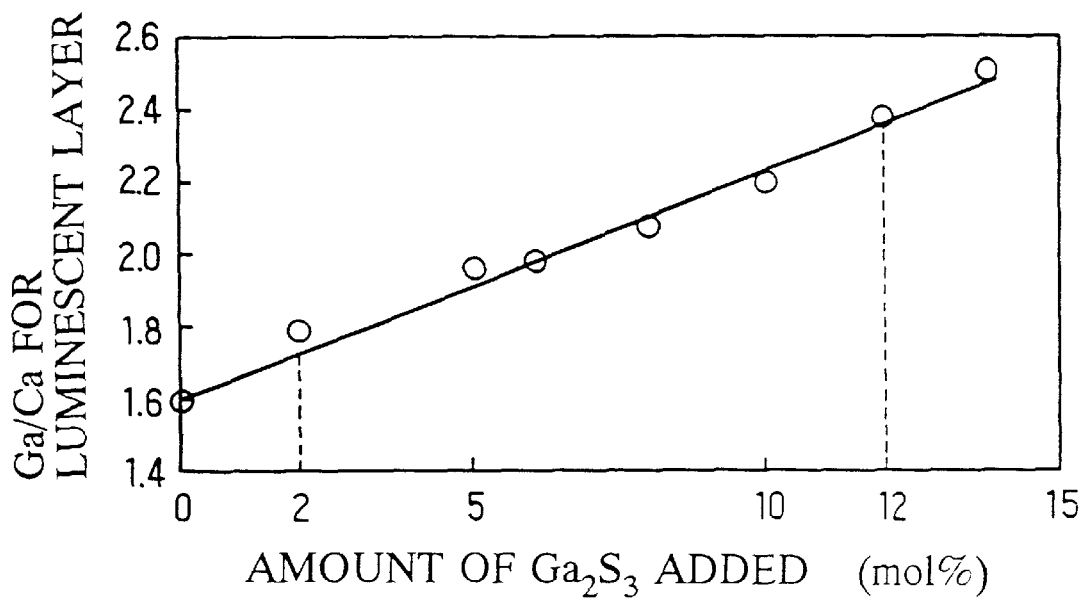
FIG. 8 is a graph showing the relationship between the amount of $Ga_2S_3$ added to the sintered target and the ratio of Ga/Ca in the formed luminescent layer.

FIG. 8 shows the ratio Ga/Ca in the luminescent layers relative to the amount of $Ga_2S_3$ added. To attain the successful growth of $CaGa_2S_4$, the ratio Ga/Ca must be near to the stoichiometric ratio of 2. The experiments verified the successful result within the range between 1.8 and 2.4 for the ratio Ga/Ca. This is because the ratio Ga/Ca of smaller than 1.8 results in the preferential growth of CaS but the ratio Ga/Ca of larger than 2.4 results in the preferential growth of $Ga_2S_3$. The preferential growth of CaS makes the blue color purity lowered because of the green-emitting component caused by CaS:Ce. On the other hand, the preferential growth of $Ga_2S_3$ markedly hinders the growth of $CaGa_2S_4$. In this case, although the blue emission is surely obtained, the luminescence threshold voltage thereof inevitably increases, and further, the luminance-voltage characteristic curve becomes degraded in gradient. Accordingly, the obtained luminance is low under the same applied voltage. Therefore, from FIG. 8, it is noted that the amount of $Ga_2S_3$ to be added must be from 2 mol % to 12 mol %. The same shall apply to $Ga_2O_3$ that is added in place of $Ga_2S_3$ in a third embodiment to be mentioned below.

Herein, because the growth of CaS in a case of the ratio Ga/Ca of smaller than 1.8 depends upon the purity of the sintered target, Ga compound to be added may be less than 2 mol % when the purity of the source material powder of $CaGa_2S_4$, which is the source material of the sintered target, is high.

The substitution of $SrGa_2S_4$ for $CaGa_2S_4$ in the second embodiment gave the same results as above. Concretely, the sintered targets with $SrGa_2S_4$ having a relative density of 75% or more formed luminescent layers having high and stable Ce concentrations, while those having a relative density of less than 75% formed luminescent layers having noticeably reduced Ce concentrations. As the density of the single crystal of $SrGa_2S_4$, used was a value of 3.61 g/cm³ as reported in the above-mentioned reference.

A third embodiment of the invention is mentioned below, in which $Ga_2O_3$ is added in place of $Ga_2S_3$ in the second embodiment to produce the sintered targets.

Almost nothing of the sintered targets produced in the third embodiment where $Ga_2O_3$ was added had a relative density of 70% or less. This is considered because $Ga_2S_3$ used in the second embodiment is susceptible to hydrolysis, causing the poor reproducibility in the production of the sintered targets. As opposed to this, since $Ga_2O_3$ is extremely stable to water, its addition makes it easy to produce high-density sintered targets.

However, the use of the sintered targets with $Ga_2O_3$ is problematic in that oxygen is introduced in the luminescent layer 4 from $Ga_2O_3$. The introduction of oxygen into the luminescent layer 4 retards the crystallization of the luminescent layer 4 in its heat treatment, thereby lowering the luminance of the formed EL device. In order to solve this problem, a reducing gas such as $H_2S$ is introduced into the sputtering gas for the formation of the luminescent layer 4 in this third embodiment.

The experiments verified that the EL devices formed with $Ga_2O_3$ of 6 mol % in the absence of $H_2S$ lost their luminescence but those formed in the presence of 5 mol % of $H_2S$ were successfully luminescent. Therefore, the introduction of 5 mol % or more of $H_2S$ into the sputtering gas for EL devices with $Ga_2O_3$ substantially prevents the introduction of oxygen into the luminescent layers and is effective in successfully producing EL devices.

The same relationship between the relative density of the sintered target and the Ce concentration in the luminescent layer as that shown in FIG. 7 was observed also for the sintered targets with $Ga_2O_3$. Concretely, the sintered targets with relative density of 75% or more formed luminescent layers with reduced variation in the Ce concentration with good reproducibility.

If stable Ga compounds are desired, GaS may be used in place of $Ga_2O_3$.

Although the above-mentioned embodiments demonstrated the production of $CaGa_2S_4$:Ce EL devices, the present invention is not limited to the $CaGa_2S_4$:Ce luminescent layer. Ca in the compound may be substituted, for example, with Sr to give the chemical formula $Ca_{1-p}Sr_pGa_2S_4$:Ce which are within the scope of the invention. Next, a fourth embodiment of the invention is mentioned below, in which $Ca_{1-p}Sr_pGa_2S_4$:Ce layer is formed as a luminescent layer.

The luminescent layer 4 composed of $Ca_{0.5}Sr_{0.5}Ga_2S_4$:Ce will be explained as a typical example of the fourth embodiment. As the fourth embodiment has the same structure as that of the first embodiment shown in FIG. 1 other than the material of the luminescent layer 4, the explanation below will be made with reference to FIG. 1.

As in the foregoing embodiments, on the glass substrate 1 is formed the first transparent electrode 2 of a ZnO film and the first insulating layer 3 of $SrTiO_3$ in that order. Then, the luminescent layer 4 is formed on the first insulating layer 3 by sputtering.

The sputtering target used herein is prepared by: mixing $CaGa_2S_4$ with the iso-molar amount of $SrGa_2S_4$; adding 4 mol % of $CeF_3$ and 4 mol % of $Ga_2S_3$ to the $CaGa_2S_4$ and $SrGa_2S_4$ mixture; and sintering in hydrogen sulfide atmosphere the resultant mixture. Here, to produce the sintered target, used was a source material powder of $CaGa_2S_4$ with high purity, which has the ratio of the X-ray diffraction peak intensity $I_2$ for the (200) reflection of CaS to the X-ray diffraction peak intensity Ii for the (400) reflection of $CaGa_2S_4$, $I_2/I_1$, of nearly 0, as in the first embodiment (see the X-ray diffraction spectrum of FIG. 2).

The composition of the thus-formed sintered target is given by $Ca_{0.5}Sr_{0.5}Ga_2S_4$:Ce, and the X-ray diffraction spectrum therefor also showed $I_2/I_1$ of nearly 0. However, the X-ray diffraction spectrum for the sintered target exhibited characteristics having peaks corresponding to $CaGa_2S_4$ and $SrGa_2S_4$, respectively. Although peaks corresponding to $SrGa_2S_4$ appear in the X-ray diffraction spectrum, the purity of blue emission from the luminescent layers made from the sintered targets with $I_2/I_1$ of 0.5 or less will be improved like in the first embodiment.

Furthermore, the sintered target formed had a relative density of 80%. The relative density as referred to herein is defined as an average value calculated in relation to the density of the single crystal of $CaGa_2S_4$ and the density of the single crystal of $SrGa_2S_4$, both being cited in the above-mentioned document, and in association with the mixing ratio of calcium and strontium thiogallates. In this fourth embodiment, as the same molar amount of $CaGa_2S_4$ and $SrGa_2S_4$ are mixed, using the density of the single crystal of $CaGa_2S_4$ of 3.38 g/cm³, the density of the single crystal of SrGa$_2$S$_4$ of 3.61 g/cm$^3$, the molecular weight of CaGa$_2$S$_4$ of 307.8 g/mol and the molecular weight of SrGa$_2$S$_4$ of 355.34 g/mol, the density of the single crystal of Ca$_{0.5}$Sr$_{0.5}$Ga$_2$S$_4$, ρ, is calculated as:

$$\rho = \frac{307.8 \times 0.5 + 355.34 \times 0.5}{\frac{307.8}{3.38} \times 0.5 + \frac{355.34}{3.61} \times 0.5} = 3.50 \ [g/cm^3]$$

Using the calculated density of the single crystal of Ca$_{0.5}$Sr$_{0.5}$Ga$_2$S$_4$, ρ, the relative density of the sintered target is obtained.

Furthermore, the same relationship between the relative density of the sintered target and the Ce concentration in the luminescent layer as that shown in FIG. 7 was observed also for the sintered targets of the composition Ca$_{0.5}$Sr$_{0.5}$Ga$_2$S$_4$ with Ga$_2$S$_3$. Here, even if the compositional ratio p in Ca$_{1-p}$Sr$_p$Ga$_2$S$_4$ varies, the same characteristic as that shown in FIG. 7 can be obtained.

The sputtering to deposit the Ca$_{0.5}$Sr$_{0.5}$Ga$_2$S$_4$:Ce luminescent layer 4 is performed using above-mentioned sintered target under the conditions equal to the first embodiment.

Concretely, a mixed gas comprising Ar and 20 mol %, relative to Ar, of H$_2$S (hydrogen sulfide) is introduced into the sputtering chamber while the glass substrate 1 therein is kept at a constant temperature of 300° C., and the luminescent layer 4 is deposited at an RF power of 300 W.

Next, the thus-deposited Ca$_{0.5}$Sr$_{0.5}$Ga$_2$S$_4$:Ce luminescent layer 4 is heat-treated in an Ar atmosphere containing 20 mol % of H$_2$S, at 630° C. for 30 minutes. As a result, the Ca$_{0.5}$Sr$_{0.5}$Ga$_2$S$_4$:Ce luminescent layer 4, which is in amorphous state and therefore is not luminescent just after the deposition, becomes crystallized and luminescent.

Next, the second insulating layer 5 of SrTiO$_3$ is formed on the luminescent layer 4, and then, the second transparent electrode 6 of a ZnO film is formed on the second insulating layer 5 in the same manner as in the first embodiment.

The X-ray diffraction spectrum for the thin film EL device 10 thus produced in the manner mentioned above was investigated.

Figure 9:
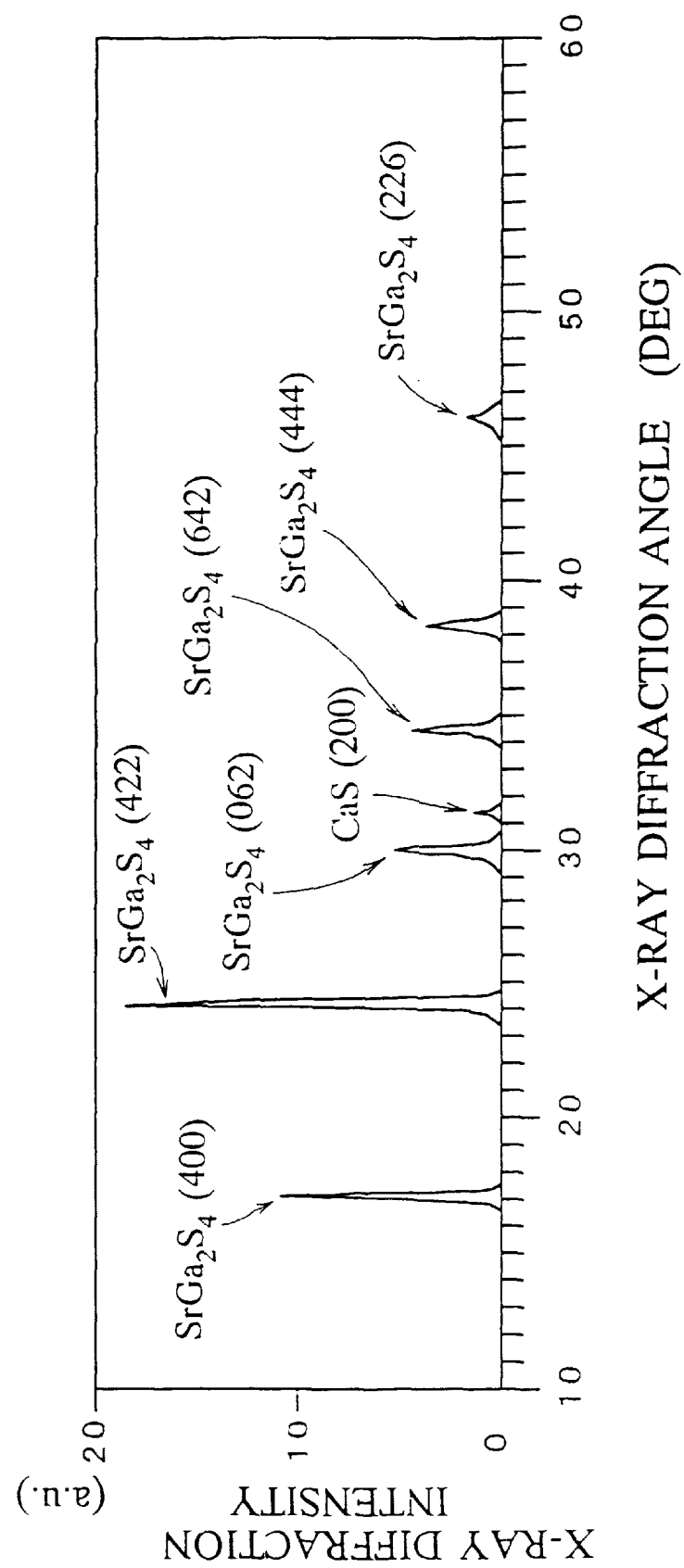
FIG. 9 is a graph showing the X-ray diffraction spectrum for the luminescent layer according to a fourth embodiment of the present invention.

FIG. 9 shows the X-ray diffraction spectrum for the Ca$_{0.5}$Sr$_{0.5}$Ga$_2$S$_4$:Ce luminescent layer 4 as formed from the sintered target by sputtering followed by heat treatment. As is understood from FIG. 9, peaks of the diffraction intensity representing SrGa$_2$S$_4$ appear whereas peaks of the diffraction intensity representing CaGa$_2$S$_4$ are absent. Additionally, differing from the first embodiment, the X-ray diffraction spectrum shown in FIG. 9 verifies that the diffraction peak intensity for the (422) reflection of SrGa$_2$S$_4$ tends to be a main peak in case of the Ca$_{0.5}$Sr$_{0.5}$Ga$_2$S$_4$:Ce luminescent layer.

Therefore, in case the Ca$_{1-p}$Sr$_p$Ga$_2$S$_4$:Ce luminescent layer is formed, the ratio of the X-ray diffraction peak intensity I$_2$ for the (200) reflection of CaS to the X-ray diffraction peak intensity I$_3$ for the (422) reflection of SrGa$_2$S$_4$, I$_2$/I$_3$, should be evaluated.

The ratio of I$_2$/I$_3$ in the luminescent layer was about 0.07. The CIE chromaticity coordinates for the EL device 10 thus produced were such that x=0.15 and y=0.14, and the purity of the blue color from the EL device 10 was higher than that from the EL device of the first embodiment.

In the above explanation of the fourth embodiment, the Ca$_{0.5}$Sr$_{0.5}$Ga$_2$S$_4$:Ce luminescent layer is mainly mentioned as a typical example; however, the compositional ratio p in the chemical formula Ca$_{1-p}$Sr$_p$Ga$_2$S$_4$ can be changed. Here, it is preferable that the compositional ratio p should be from 0.15 to 0.6 inclusive (0.15≦p≦0.6), which results in luminescence with a stable luminance.

Next, the relationship between the ratio I$_2$/I$_3$ in the luminescent layer and the purity of blue color emission is referred to below.

CaS was further intentionally added to the source material of the target initially showing I$_2$/I$_1$ of nearly 0, such as that used in the fourth embodiment, and formed into sintered targets. Using these, luminescent layers with varying I$_2$/I$_3$ ratios were formed by sputtering and their color emission was investigated.

Figure 10:
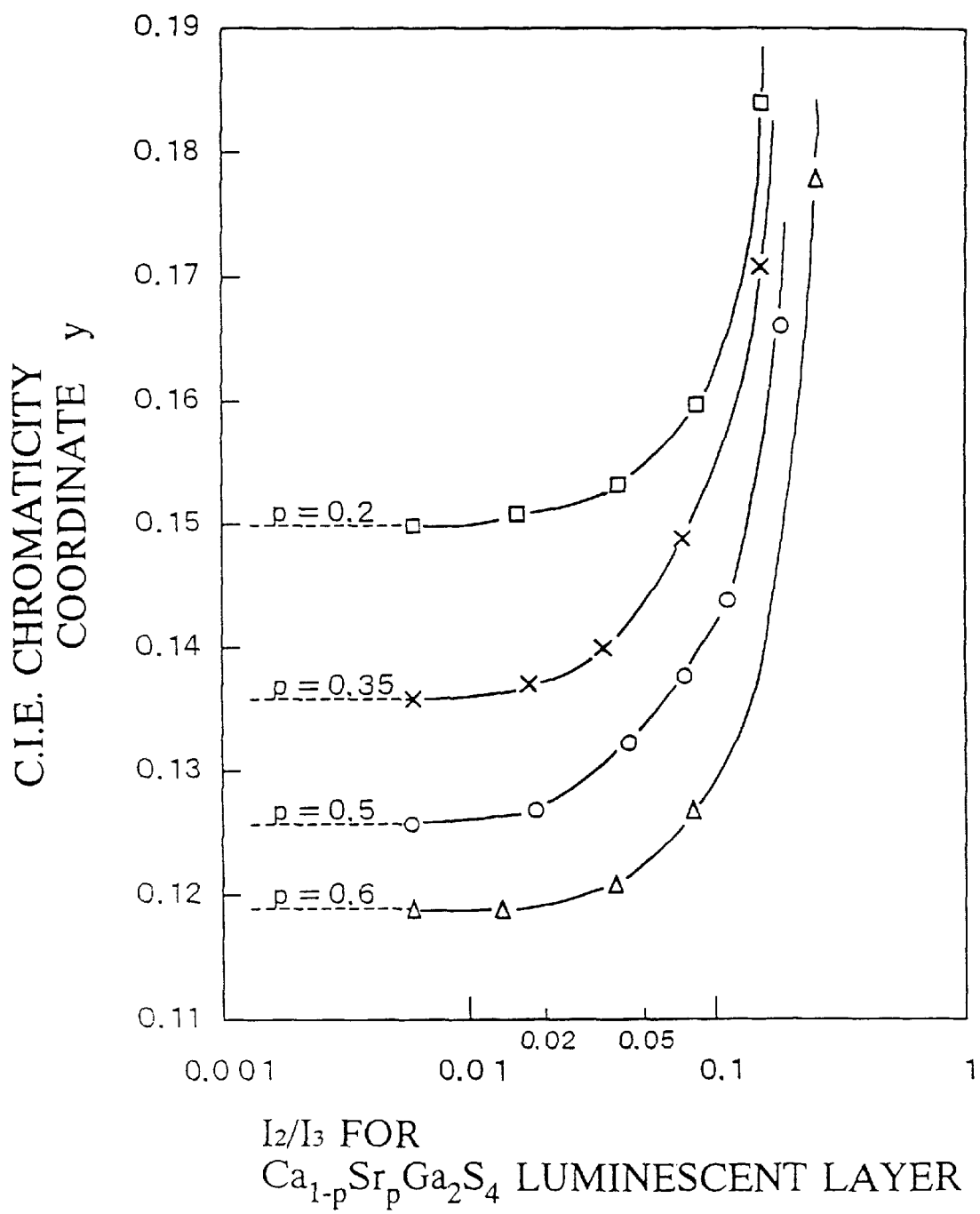
FIG. 10 is a graph showing the variation in the value y for the CIE chromaticity coordinates relative to the variation in the ratio $I_2/I_3$ for the formed luminescent layers of the fourth embodiment.

FIG. 10 shows the variation in the value y for the CIE chromaticity coordinates relative to the variation in the ratio I$_2$/I$_3$ for the luminescent layers formed. It has been confirmed that the value x for the coordinates did not change and was constantly 0.15 irrespective of the variation in the ratio I$_2$/I$_3$. As is known from FIG. 10, the value y for the CIE chromaticity coordinates sharply increases when the ratio I$_2$/I$_3$ exceeds 0.1, which degrades the blue color purity due to the green-emitting component caused by CaS:Ce. Therefore, it is desirable that the ratio I$_2$/I$_3$ is controlled to be 0.1 or less.

As described above, by lowering the ratio I$_2$/I$_3$ in the luminescent layer, or, in the alternative, by lowering the ratio I$_2$/I$_1$ in the sintered target, the green-emitting component to be caused by CaS:Ce is decreased and blue-EL emission with high purity is attained.

Furthermore, discussing the present invention with reference to the sputtering targets to be used, the targets may be composed of CaGa$_2$S$_4$:Ce with a gallium compound of Ga$_2$S$_3$ or Ga$_2$O$_3$ but are not limited to only these compositions.

When Eu, Mn or the like was used in place of Ce as the luminescent center element, 75% or more of the relative density of the sintered target attained a high stabilized concentration of the luminescent center element in the formed luminescent layers. In case BaGa$_2$S$_4$, SrGa$_2$S$_4$, CaAl$_2$S$_4$, ZnIn$_2$S$_4$ and the like were used as the source materials for the targets, the same results as above was also verified.

Summarizing these, therefore, the sputtering targets for use in the present invention may be made of any sintered substances to be produced by mixing a source material of a II-IIIb-VIb compound with single substances or compounds of a luminescent center element and of the group IIIb element constituting the source material followed by sintering the resulting mixture. It is desirable that the density of the sintered targets for use in the invention is at least 75%, in terms of the relative density, of the density of the single crystal of the source materials. Using the targets that meet the conditions, the unevenness of the luminescent center element in the luminescent layers to be formed by sputtering is reduced and the concentration of the luminescent center element in the formed luminescent layers is stabilized high, whereby the fluctuation in the emission luminance of the formed luminescent layers is prevented.

In case sintered targets of MGa$_2$S$_4$:Ce with excess Ga$_2$S$_3$ are used to form luminescent layers of MGa$_2$S$_4$:Ce by sputtering, for example, as in U.S. Pat. No. 5,309,070, the luminescent layers formed may have elevated luminance but the luminance varies in different luminescent layers due to the fluctuation in the concentration of the luminescent center element in the luminescent layers. The techniques invented in the second and third embodiments are effective in solving such problems in the prior art.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for producing an electroluminescent device, which comprises depositing via sputtering a $CaGa_2S_4$:Ce layer, which functions as a luminescent layer of the electroluminescent device, from a sintered target made of $CaGa_2S_4$ doped with Ce, wherein the sintered target has an X-ray diffraction spectrum with a ratio of an X-ray diffraction peak intensity for a (200) reflection of CaS to an X-ray diffraction peak intensity for a (400) reflection of $CaGa_2S_4$ that is 0.5 or less, wherein the luminescent layer has an X-ray diffraction spectrum thereof with a ratio of an X-ray diffraction peak intensity for a (200) reflection of CaS to an X-ray diffraction peak intensity for a (400) reflection of $CaGa_2S_4$ that is 0.1 or less, and wherein the luminescent layer has a y value on CIE chromaticity coordinates of 0.18 or less.

2. A method as claimed in claim 1, further comprising successively laminating a substrate, a first electrode, a first insulating layer, the luminescent layer, a second insulating layer and a second electrode, wherein the luminescent layer is formed directly on the first insulating layer.

3. A method for producing an electroluminescent device, comprising:

preparing a sintered target made of $CaGa_2S_4$ doped with Ce; and depositing a luminescent layer of an electroluminescent device via sputtering from the sintered target,
wherein the sintered target is selected to assume in an X-ray diffraction spectrum thereof a diffraction peak for CaS controlled such that a ratio of an X-ray diffraction peak intensity for a (200) reflection of CaS to an X-ray diffraction peak intensity for a (400) reflection of $CaGa_2S_4$ is 0.5 or less, wherein the luminescent layer has an X-ray diffraction spectrum thereof with a ratio of an X-ray diffraction peak intensity for a (200) reflection of CaS to an X-ray diffraction peak intensity for a (400) reflection of $CaGa_2S_4$ that is 0.1 or less, and wherein the luminescent layer has a y value on CIE chromaticity coordinates of 0.18 or less.

4. A method as claimed in claim 3, wherein said preparing of the sintered target includes sintering a source material powder of $CaGa_2S_4$ which is selected to show in an X-ray diffraction spectrum thereof a ratio of the X-ray diffraction peak intensity for the (200) reflection of CaS to the X-ray diffraction peak intensity for the (400) reflection of $CaGa_2S_4$ that is 0.5 or less to produce the sintered target, wherein the sintered target produces an X-ray diffraction spectrum with a ratio of an X-ray diffraction peak intensity for a (200) reflection of CaS to an X-ray diffraction peak intensity for a (400) reflection of $CaGa_2S_4$ that is 0.1 or less.

5. A method as claimed in claim 3, wherein said preparing of the sintered target comprises incorporating an additive gallium compound into the sintered target.

6. A method as claimed in claim 5, wherein the additive gallium compound is at least one member selected from the group consisting of GaS, $Ga_2S_3$ and $Ga_2O_3$.

7. A method as claimed in claim 5, wherein the additive gallium compound is at least one member selected from the group consisting of $Ga_2S_3$ and $Ga_2O_3$ and an amount of the additive gallium compound to be incorporated is from 2 mol % to 12 mol % of $CaGa_2S_4$ which mainly makes up the sintered target.

8. A method as claimed in claim 5, wherein the additive gallium compound is $Ga_2O_3$ and said depositing of the luminesent layer is performed in a sputtering gas containing a reducing gas.

9. A method as claimed in claim 8, wherein the reducing gas is hydrogen sulfide and the concentration of hydrogen sulfide in the sputtering gas is at least 5 mol %.

10. A method as claimed in claim 9, wherein the density of the sintered target prepared is selected to be at least 75% of the density of the single crystalline $CaGa_2S_4$.

11. A method as claimed in claim 10, wherein an edge of the sintered target is chamfered or round-cornered.

12. A method for producing an electroluminescent device, comprising:

preparing a sintered target from a source material of a II-IIIb-VIb compound mixed with single substances or compounds of a luminescent center element and an additive group IIIb compound such that the sintered target prepared has a density of at least 75% of the density of the single crystal of the source material; and depositing a luminescent layer by sputtering the sintered target, wherein the sintered target presents a ratio of an X-ray diffraction peak intensity for a (200) reflection of a II-VIb compound to an X-ray diffraction peak intensity for a (400) reflection of a II-IIIb-VIb compound that is 0.1 or less, and wherein the luminescent layer has a y value on CIE chromaticity coordinates of 0.18 or less;

wherein the II-IIIb-VIb compound has a chemical formula of $II\text{-}IIIb_2\text{-}VIb_4$, at least one of gallium sulfide and gallium oxide is used as the additive group IIIb compound and the amount of the additive group IIIb compound is from 2 mol % to 12 mol %;

and further wherein the compound having the chemical formula of $II\text{-}IIIb_2\text{-}VIb_4$ is $CaGa_2S_4$.

13. A method as claimed in claim 12, wherein the additive group IIIb compound is gallium oxide ($Ga_2O_3$).

14. A method for producing an electroluminescent device, comprising:

forming an optically transparent first electrode on an optically transparent substrate;

forming an optically transparent first insulating layer on the first electrode;

forming a luminescent layer directly on the first insulating layer by sputtering from a sintered target;

forming a second insulating layer directly on the luminescent layer; and forming a second electrode on the second insulating layer, wherein the sintered target is made of $CaGa_2S_4$ doped with Ce, the sintered target having an X-ray diffraction spectrum thereof with a ratio of an X-ray diffraction peak intensity for a (200) reflection of CaS to an X-ray diffraction peak intensity for a (400) reflection of $CaGa_2S_4$ that is 0.5 or less, and wherein the luminescent layer formed directly on the first insulating layer has an X-ray diffraction spectrum thereof with a ratio of an X-ray diffraction peak intensity for a (200) reflection of CaS to an X-ray diffraction peak intensity for a (400) reflection of $CaGa_2S_4$ that is 0.1 or less, and further wherein the luminescent layer has a y value on CIE chromaticity coordinates of 0.18 or less.

* * * * *